United States Patent Office.

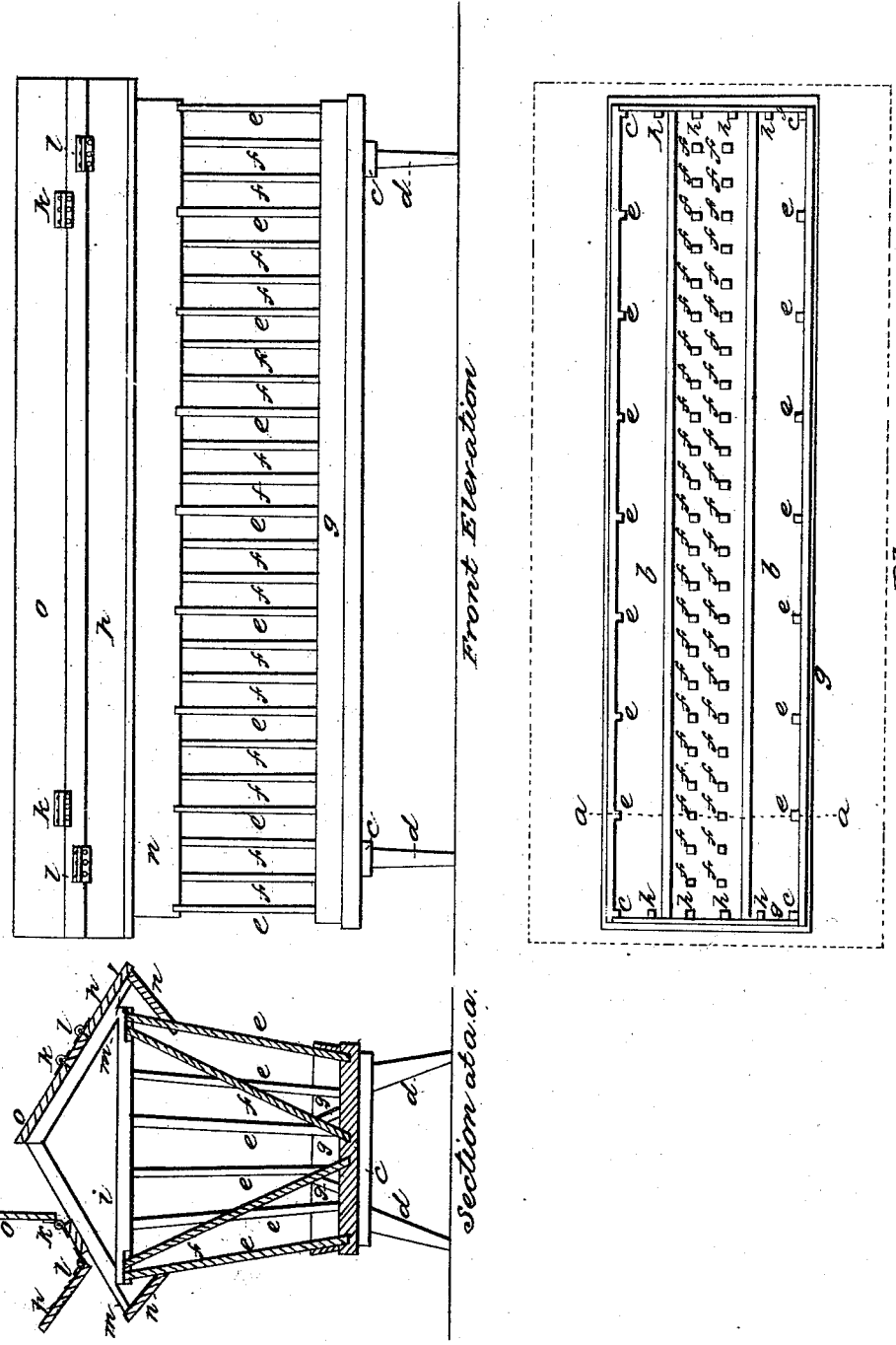

JOHN W. BLANCHARD, OF RUTLAND, WISCONSIN.

Letters Patent No. 62,522, dated March 5, 1867.

---

IMPROVEMENT IN FEED-RACKS.

---

The Schedule referred to in these Letters Patent and making part of the same.

---

I, JOHN W. BLANCHARD, of Rutland, in the county of Dane, and State of Wisconsin, have invented a new and improved Feed-Rack; and I do hereby declare that the following is a full and exact description thereof, reference being had to the accompanying drawings, and to the letters of reference marked thereon.

The nature of my invention consists in constructing a feed-rack for feeding hay, straw, stalks, and other coarse feed, and also feeding in the same rack grain mash and other fine feed without waste, and keeping the whole under cover and movable from place to place by hand, and at the same time separating the animals at the rack so that each one can only take his own feed.

To enable others to make and use my invention, I will proceed to describe its construction.

I take two sixteen-feet boards, one inch thick, and each one foot wide, and put together for the bottom $b\ b$, laid on two pieces of scantling two by four inches, and set on legs ten inches high, $c\ c$ and $d\ d$. Each side is fitted with a rack extending upward from the outward edge $e$, the rounds of which are one foot apart to keep the animals' heads separated, and an inner rack, the rounds of which are four inches apart, marked $f$, and slanting from the top inwards, so as to give eight inches clear for the feed trough, which is constructed upon the outer edge of the bottom boards, between the two racks marked $g$, and is three inches deep. The end of the rack may be terminated with rounds, $h$. The upper end of each rack terminates in the same frame, $i$, which is constructed of two by four inch scantling, and is three feet wide and sixteen feet long; and from this upper frame there rises a roof, with the proper slant, consisting on each side of single board two feet wide, split so as to allow the upper foot of width $o$ to open downwards upon hinges, $k$, to insert the hay or straw, and the lower eight inches, $p$, to open upward upon hinges, $e$, to put in the grain and fine feed, and which boards are placed upon rafters, $m$, projecting downwards so as to allow a board, $n$, eight inches wide, to run from their ends downwards and inwards, with its lower edge over the trough, so as to convey the grain and fine feed properly into the trough; and for this purpose its lower edge is notched into the rounds of the outer rack, or they may pass through. The extreme height of rack from the ground to the peak of the roof is five and one-half feet. The dimensions above given are the proper ones for the construction of a rack for sheep. For cattle and larger animals the construction would be similar, with increased size. The whole rack, with the exception of the hinges and nails, may be constructed of any ordinary wood, and the rounds may be of split or round wood, and the frame of sawed wood or poles, and it may be made either in a rough or finished style.

When used, the rack is taken by hand and placed in the most convenient location for feeding, near the sheds or stacks. The upper lids are both thrown down, and the inner rack filled with the hay, straw, or other coarse feed, and the lids again thrown back to their places, so as to secure the feed from the rain or snow. The lower lid may be lifted up, and the grain or fine feed may be poured in upon the board $n$, sliding down into the trough $g$, and the lid may then be thrown down to its place, keeping out the wet and snow. The animals will stand each in its own place, the forward rack keeping their heads apart and not allowing them to be driven away, and keeping other animals from getting their feed, and at the same time preventing any waste of hay or grain.

What I claim as my invention, and desire to secure by Letters Patent, is—

The arrangement of the board $n$ for conveying the feed, and the roof boards $o$ and $p$ opening in the manner described, in connection with the racks $e$ and $f$ and trough $g$, for the purposes described.

JOHN W. BLANCHARD.

Witnesses:
CHAS. T. WAKELEY,
FRANCIS MASSING.